United States Patent [19]
Schilling et al.

[11] Patent Number: 5,188,505
[45] Date of Patent: Feb. 23, 1993

[54] STRUCTURAL RING MECHANISM FOR CONTAINMENT HOUSING OF TURBOFAN

[75] Inventors: Jan C. Schilling, Middletown; James W. Tucker; Carl C. Koch, both of Cincinnati, all of Ohio

[73] Assignee: General Electric Company, Cincinnati, Ohio

[21] Appl. No.: 772,302

[22] Filed: Oct. 7, 1991

[51] Int. Cl.⁵ .............................................. F01D 25/24
[52] U.S. Cl. ........................................ 415/9; 415/200
[58] Field of Search .............. 415/9, 196, 197, 200; 29/889.2

[56] References Cited

U.S. PATENT DOCUMENTS

| | | | |
|---|---|---|---|
| 3,261,228 | 7/1966 | Rothman | 415/9 |
| 4,149,824 | 4/1979 | Adamson | 415/9 |
| 4,197,052 | 4/1980 | Lardellier | 415/9 |
| 4,199,300 | 4/1980 | Tubbs . | |
| 4,377,370 | 3/1983 | Porcelli . | |
| 4,411,589 | 10/1983 | Joubert et al. | 415/9 |
| 4,417,848 | 11/1983 | Dembeck . | |
| 4,500,252 | 2/1985 | Monhardt et al. . | |
| 4,547,122 | 10/1985 | Leech . | |
| 4,598,449 | 7/1986 | Monhardt et al. . | |
| 4,639,188 | 1/1987 | Swadley . | |
| 4,648,795 | 3/1987 | Lardellier . | |

OTHER PUBLICATIONS

S. Mitchell et al.; "Containment"; *The Leading Edge*; Winter 1990/1991; pp. 23-28.

Primary Examiner—Edward K. Look
Assistant Examiner—James A. Larson
Attorney, Agent, or Firm—Jerome C. Squillaro

[57] ABSTRACT

A containment system for wide chord turbofan fan blades, the system having a containment housing which forms a nesting area to accommodate broken blades and blade parts. Connected to the containment housing and constituting a part of the nesting area are structural rings which are positioned so that centrifugal forces will direct the larger blade fragments to impact upon the structural rings causing the large blade fragments to break into smaller fragments which are then easily housed in the nesting area, thus reducing the required area of the nesting area and minimizing the weight of the containment system.

10 Claims, 2 Drawing Sheets

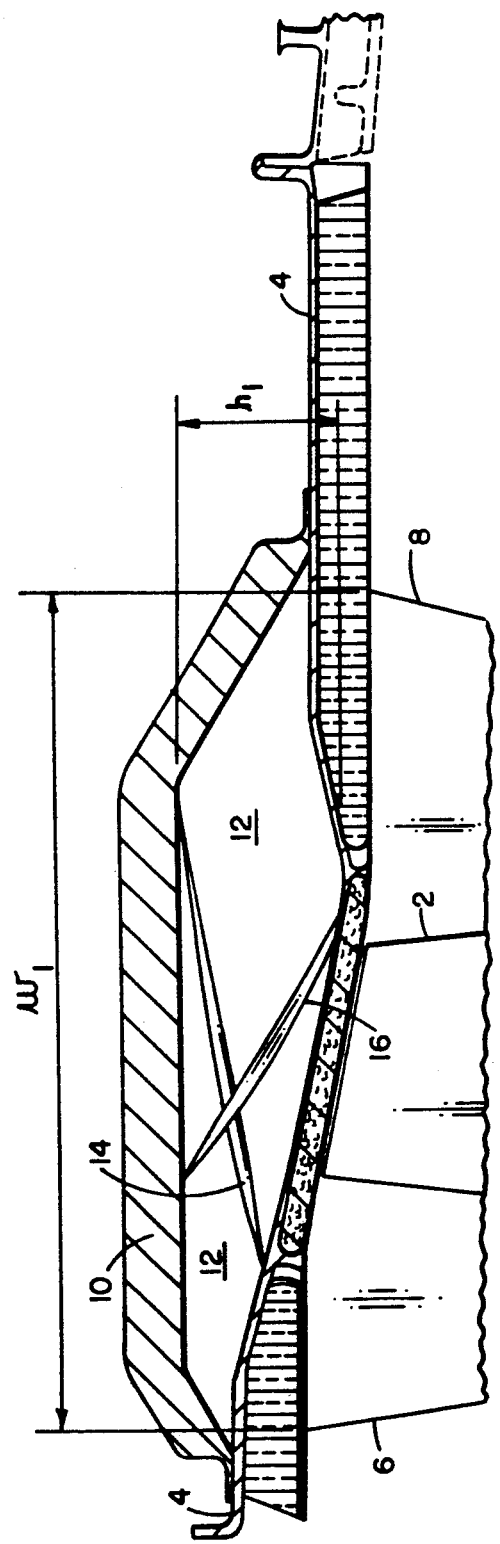
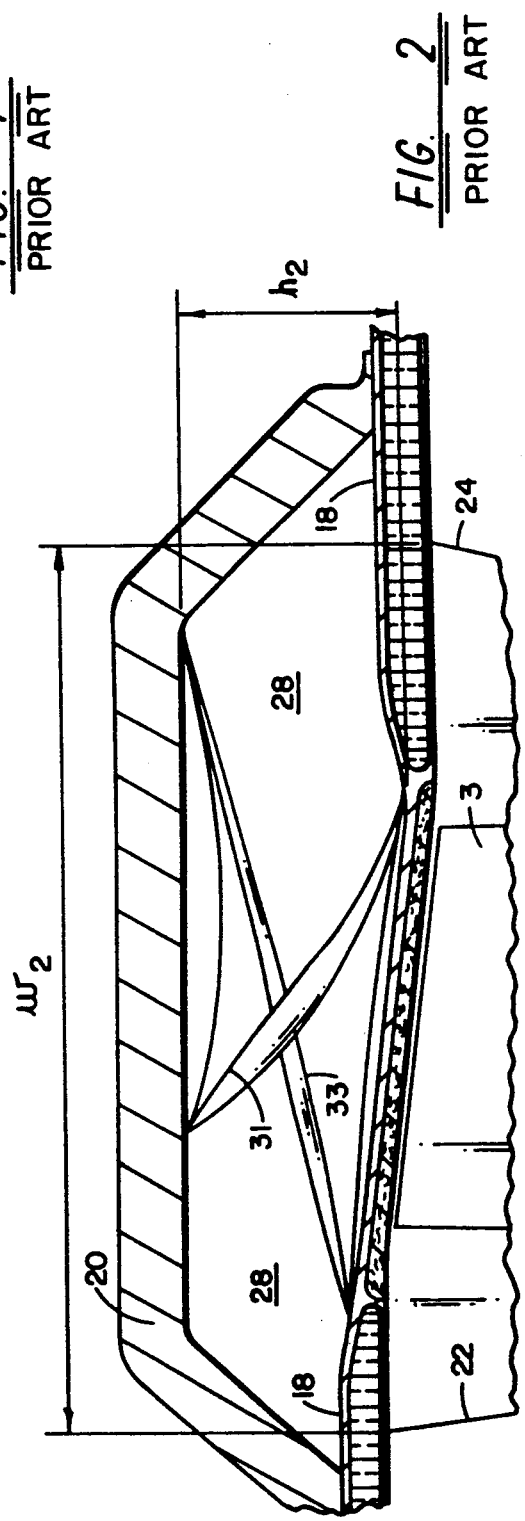

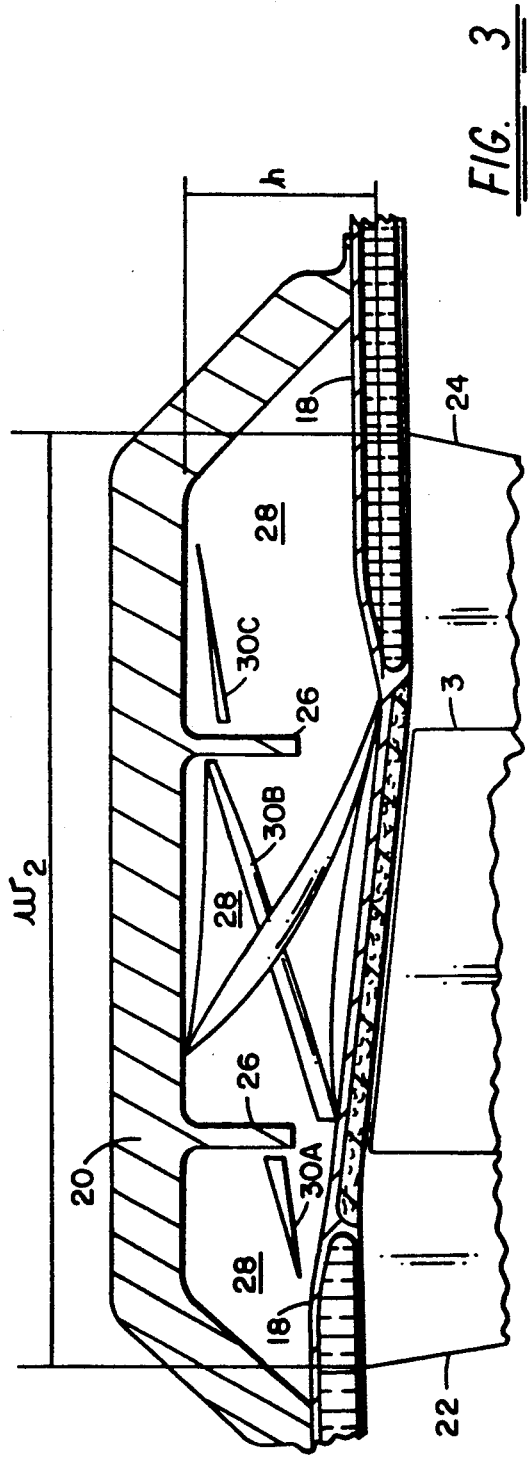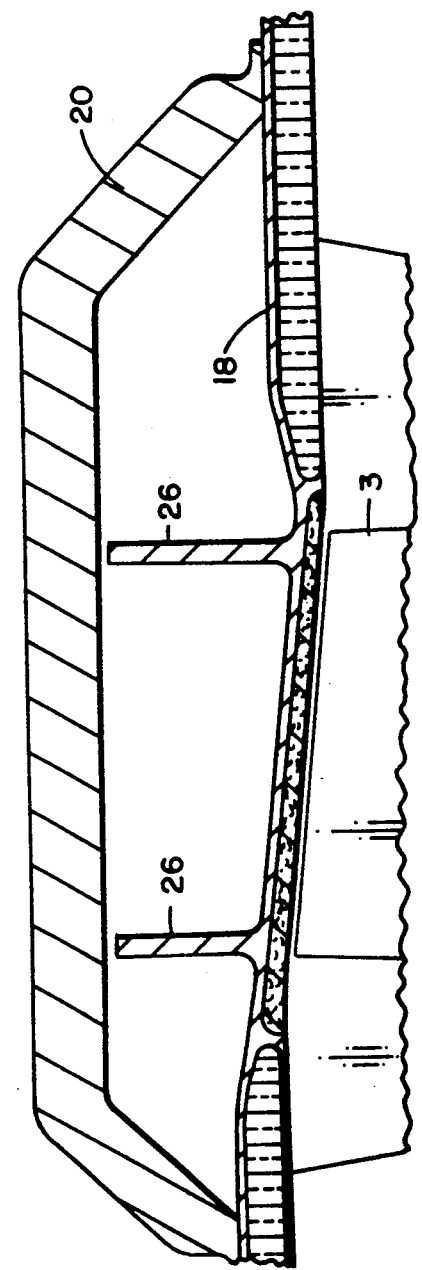

STRUCTURAL RING MECHANISM FOR CONTAINMENT HOUSING OF TURBOFAN

The present invention relates to gas turbine engines and, more particularly, to turbofan blade containment systems for capturing broken blades.

BACKGROUND OF THE INVENTION

It has long been recognized that it is desirable to capture failed blades in a turbofan engine so that failed blade fragments will not damage an operating engine. This need is particularly emphasized in the case of an airborne aircraft which experiences blade failure during the course of a flight. That the aircraft engines remain operating, is of course, a paramount concern. The prior art illustrates various apparatus for blade containment. In general, however, such apparatus includes an annular shroud member having a wall adjacent a blade airfoil, this wall is designed to accommodate and retain a detached blade or blade portion. The wall may be formed with honeycomb material or other energy absorbent, deformable materials capable of capturing blade fragments. Other apparatus may include a containment space overlaid by a penetrable material so that fragments may be captured in the containment space. In general, an area has typically been provided outside the fan flowpath incorporating some form of containment material so that a failed or released fan blade is nested out of the way of trailing blades in the fan.

FIG. 1 illustrates a conventional containment system positioned above fan blade 2, with the forward airfoil release trajectory being represented by line 6 and the aft airfoil release trajectory being represented by line 8. Blade 2 is contained by the containment housing 10 which is made of Kevlar or other appropriate containment material. The interior of the containment housing 10 represents a nesting area 12 which serves to collect the detached blade parts and keeps the blade parts from damaging the unreleased blades. Blade tip 14 and blade root 16 are shown in the nesting area 12 for purposes of illustration.

The type of containment system depicted in FIG. 1 has worked well for shrouded fan rotors with fan blades having relative high aspect ratios (e.g., 3.9 to 4.4). However, for recently developed fan blade systems with blade aspect ratios of 2.1 to 3.0 (wide chord), the nesting area will become very large and add much weight to the containment system.

Therefore, a need exists for a containment system which is able to effectively absorb failed and fragmented composite or hollow titanium, low aspect ratio fan blades while minimizing containment system weight.

SUMMARY OF THE INVENTION

Accordingly, one object of the present invention is to provide a means for dissipating energy from the released blade and storing the fragments of a released blade in a nesting area.

Another object of the present invention is to realize a blade fragment containment system which utilizes a minimum of area so that the weight of the system is minimized as well.

These and other objects and advantages of the present invention are achieved by a containment system having a containment housing, structural rings, and a nesting area for storing blade fragments. At least one structural ring is connected to the containment housing. The structural ring causes a large blade fragment to break into smaller fragments thereby reducing the kinetic energy of the fragment with the smaller fragments being captured in the nesting area.

The smaller nesting area achieved by the present invention allows the containment system for a turbofan engine using wide chord blades to realize significant weight reduction from previous systems.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 1 is a schematic side-view illustration of a prior art containment system;

FIG. 2 is a schematic side-view illustration of the nesting area of a prior art wide chord containment system;

FIG. 3 is a schematic side-view illustration of the containment system of the present invention; and FIG. 4 is a side-view schematic illustration of an alternative embodiment of the present invention in which structural rings are attached to the casing.

DETAILED DESCRIPTION OF THE

Referring now to the drawings wherein like reference numerals designate identical or corresponding parts through the respective figures and, more particularly, to FIG. 2 thereof, a containment housing 20 of a prior art containment system for a wide chord fan blade is connected to fan casing 18 positioned above wide chord fan blade 3. Blade 3 produces a forward airfoil release trajectory 22 and an aft airfoil release trajectory 24. Nesting area 28, in the interior of containment housing 20, stores blade fragments which can be large in size such as full blade root 31 and blade tip 33 (see FIG. 2). The nesting area 28 has an area equal to $w_2 \times h_2$, which area is relatively large so as to be able to accommodate a full blade fragment.

With reference to FIG. 3, there is shown one embodiment of the present invention in which a containment housing 20 is provided with structural rings 26 which can be integrally connected to the housing 20 or bolted thereto. Alternatively, the structural rings can be attached to casing 18 in a like manner (FIG. 4). The rings 26 extend into the nesting area 28. The centrifugal forces which direct fragments from blade 3 into the containment housing 20 cause the full blade fragments (e.g., blade root 31 and blade tip 33 of FIG. 2) to strike the rings 26. In such a manner a full blade fragment is broken into smaller fragments, e.g., fragments 30A, 30B, and 30C (FIG. 3).

The rings 26 serve to impede the velocity of the blade fragments while fragmenting larger fragments into smaller fragments, thus reducing the two components of the kinetic energy of the blade fragments. Since a full blade fragment is further reduced in size when it strikes the rings 26, the dimensions of the nesting area of FIG. 3 can be reduced from those of FIG. 2. In FIG. 3, nesting area 28 has an area $w_2 \times h_3$, where $h_3$ is less than $h_2$ (compare FIGS. 2 and 3). The height difference between $h_3$ and $h_2$ is approximated by the relationship $h_3 = 0.6 h_2$, with $h_3$ varying in a range from 0.4 to 0.8 of $h_2$ depending on blade number, ring number, and spacing. Therefore, the nesting area in FIG. 3 is reduced from that of FIG. 2 for purposes of reducing weight. Reduction in weight is, of course, an aerodynamically desirable feature for a reduction in weight improves the engine thrust to weight ratio thereby reducing the amount of fuel burned.

In FIG. 4, an alternative embodiment of the present invention is characterized in that the structural rings 26 are connected to the casing 18. Mounting of the rings 26 (two rings are shown in FIG. 4) directly onto casing 18 results in the further stiffening of the casing 18. Stiffness can be increased by ring number, ring height, width, and bridging between inner case 18 to outer case 20. As those skilled in the art will appreciate, a stiff fan casing is required for wide chord fan application. Furthermore, a stiff casing is required for fan rotor to casing interaction frequency control. Still further, by attaching rings 26 to the casing 18, the casing roundness control during blade fragment release is enhanced thereby minimizing secondary damage. Also, by utilizing the case mounted ring system an overall weight reduction could be realized on the casing 18 and the area of the housing 20 could be reduced in a manner similar to that of the embodiment of the present invention shown in FIG. 3.

Rings 26 can be made of either metal or composite material, depending on which material is the more weight effective. The rings must be positioned so that they do not inhibit a released blade from exiting the fan flowpath. Ideally, there would be a minimum number of rings so that a minimum portion of blade is removed. As the blade is torn, energy is dissipated and blade velocity reduced. Too much reduction in blade velocity will inhibit the blade exit trajectory and cause a collision with the trailing blade.

The amount of energy dissipated by the rings 26 of the present invention reduces the overall containment housing retention requirements which results in reduced housing weight. The reduction in weight achieved by reducing the size of the containment housing 20 more than offsets the added weight of the rings 26.

The foregoing description is intended to be illustrative and non-limiting. Numerous additions and modifications of the present invention are possible in light of the above teachings. It is therefore to be understood that the invention may be practiced otherwise than as specifically described herein and still be within the scope of the appended claims.

What is claimed is:

1. A containment system for containing failed blades and broken blade fragments of a turbofan gas turbine engine, said system comprising:
   a containment housing which forms a nesting area for storing broken blade fragments; and
   at least one structural ring formed integral to the containment housing for breaking large blade fragments into smaller blade fragments, said at least one structural ring forming part of the nesting area.

2. A system according to claim I wherein said containment housing is connected to a fan casing.

3. A system according to claim 2 wherein said containment housing is provided outside a fan flowpath.

4. A system according to claim 3 wherein said containment housing is made of Kevlar.

5. A system according to claim 1 wherein said broken blade fragments are fragments of a wide chord fan blade.

6. A containment system for containing failed blades and broken blade fragments of a turbofan gas turbine engine said system comprising:
   a casing; and
   at least one structural ring connected to said casing for breaking large blade fragments into smaller blade fragments, and wherein said at least one structural ring stiffens said casing; and
   wherein said at least one structural ring is radially outward of a fan flowpath, and wherein said at least one structural ring is positioned to allow the failed blades and the broken blade fragments to exit the fan flowpath and to be stored in a nesting area.

7. A system according to claim 6 further comprising:
   a containment housing connected to said casing to form said nesting area; and
   wherein said at least one structural ring extends radially outward from said casing and into said nesting area.

8. A system according to claim 7 wherein:
   said at least one structural ring provides rotor system to casing frequency interaction as a result of said at least are structural ring stiffening said casing.

9. A method of assembling a gas turbine engine, the gas turbine engine including a containment housing connected to a casing to form a nesting area for storing broken blades and blade fragments, at least one structural ring being connected to the containment housing, the at least one structural ring being exterior to a fan flowpath, the method comprising the steps of:
   associating the at least one structural ring with the containment housing so as to allow the broken blades and blade fragments to exit the fan flowpath and strike the at least one structural ring thereby reducing the kinetic energy of the broken blades and blade fragments; and
   minimizing a size of the nesting area and a combined weight of the containment housing and the at least one structural ring by utilizing the at least one structural ring to break larger ones of the broken blades and blade fragments into smaller blade fragments.

10. A method of assembling a gas turbine engine, the gas turbine engine including a casing connected to a containment housing to form a nesting are for storing broken blades and blade fragments, at least one structural ring being connected to the casing, the at least one structural ring being exterior to a fan flowpath and extending radially outward from the casing into the nesting area, the method comprising the steps of:
   associating the at least one structural ring with the casing so as to allow the broken blades and blade fragments to exit the fan flowpath and strike the at least one structural ring thereby reducing the kinetic energy of the broken blades and blade fragments; and
   minimizing a size of the nesting area nd a combined weight of the containment housing and the at least one structural ring by utilizing the at least one structural ring to break larger ones of the broken blades and blade fragments into smaller blade fragments.

* * * * *